United States Patent
Ghosh et al.

(10) Patent No.: US 10,432,570 B2
(45) Date of Patent: Oct. 1, 2019

(54) SYSTEMS AND METHODS FOR TRANSACTION MESSAGING USING SOCIAL NETWORKING PLATFORMS

(71) Applicant: MasterCard International Incorporated, Purchase, NY (US)

(72) Inventors: Debashis Ghosh, Charlotte, NC (US); Manash Bhattacharjee, Jersey City, NJ (US)

(73) Assignee: Mastercard International Incorporated, Purchase, NY (US)

( * ) Notice: Subject to any disclaimer, the term of this patent is extended or adjusted under 35 U.S.C. 154(b) by 109 days.

(21) Appl. No.: 15/171,972

(22) Filed: Jun. 2, 2016

(65) Prior Publication Data
US 2017/0353422 A1  Dec. 7, 2017

(51) Int. Cl.
| | |
|---|---|
| H04L 12/58 | (2006.01) |
| G06Q 20/12 | (2012.01) |
| G06F 16/951 | (2019.01) |
| G06Q 20/32 | (2012.01) |
| G06Q 50/00 | (2012.01) |
| H04L 12/26 | (2006.01) |

(52) U.S. Cl.
CPC ............ *H04L 51/32* (2013.01); *G06F 16/951* (2019.01); *G06Q 20/12* (2013.01); *G06Q 20/3224* (2013.01); *G06Q 50/01* (2013.01); *H04L 43/028* (2013.01)

(58) Field of Classification Search
CPC ........ G06Q 20/12; G06Q 10/02; G06Q 50/01; H04L 51/32
See application file for complete search history.

(56) References Cited

U.S. PATENT DOCUMENTS

| | | | | |
|---|---|---|---|---|
| 2002/0156749 A1* | 10/2002 | Sardy | ............... | G06Q 10/02 705/80 |
| 2003/0120608 A1* | 6/2003 | Pereyra | ............... | G06Q 20/12 705/64 |
| 2008/0010099 A1* | 1/2008 | Walker | ............... | G06Q 10/02 705/4 |
| 2012/0016721 A1* | 1/2012 | Weinman | ............... | G06Q 10/06 705/7.35 |
| 2012/0150740 A1 | 6/2012 | Isaacson et al. | | |
| 2012/0226530 A1 | 9/2012 | Gebb et al. | | |

(Continued)

OTHER PUBLICATIONS

Online marketplace, Wikipedia, Mar. 22, 2016, pp. 1-2.*

*Primary Examiner* — Vivek Srivastava
*Assistant Examiner* — Muhammad Raza
(74) *Attorney, Agent, or Firm* — Armstrong Teasdale LLP

(57) ABSTRACT

A computer-implemented method for processing transaction messages using a social network platform between a requestor and a responder is provided. The method includes receiving a social network message including an item request and a predefined hashtagged identifier. The method further includes transmitting the social network message to one or more registered providers. The method also includes receiving a confirmation from a first registered provider of the one or more registered providers that the first registered provider will provide the requested item. The method further includes transmitting payment information for the item request to a payment processor. The method also includes transmitting a notification to the first registered provider to provide the requested item.

12 Claims, 6 Drawing Sheets

(56) References Cited

U.S. PATENT DOCUMENTS

| | | | |
|---|---|---|---|
| 2012/0226545 A1 | 9/2012 | Gebb et al. | |
| 2013/0046655 A1* | 2/2013 | Karkera | G06Q 20/027 |
| | | | 705/26.41 |
| 2013/0086153 A1* | 4/2013 | Vendrow | H04L 51/066 |
| | | | 709/203 |
| 2013/0090959 A1* | 4/2013 | Kvamme | G06Q 10/02 |
| | | | 705/5 |
| 2013/0246120 A1 | 9/2013 | Chang et al. | |
| 2013/0246176 A1 | 9/2013 | Chang et al. | |
| 2014/0081776 A1 | 3/2014 | King et al. | |
| 2014/0081809 A1 | 3/2014 | King et al. | |
| 2014/0278865 A1 | 9/2014 | Kumar et al. | |
| 2015/0088650 A1* | 3/2015 | Taylor | G06F 17/30684 |
| | | | 705/14.54 |
| 2015/0278775 A1 | 10/2015 | Kosloski et al. | |
| 2016/0093009 A1* | 3/2016 | Goldklang | G06Q 30/0611 |
| | | | 705/80 |
| 2016/0117612 A1* | 4/2016 | Hong | G06Q 10/02 |
| | | | 705/5 |
| 2016/0125397 A1* | 5/2016 | Strydom | G06Q 20/08 |
| | | | 705/66 |
| 2016/0260032 A1* | 9/2016 | Woon | G06Q 10/02 |
| 2016/0269883 A1* | 9/2016 | Eswaran | H04W 4/025 |
| 2017/0039652 A1* | 2/2017 | Sandre | H04L 63/102 |

\* cited by examiner

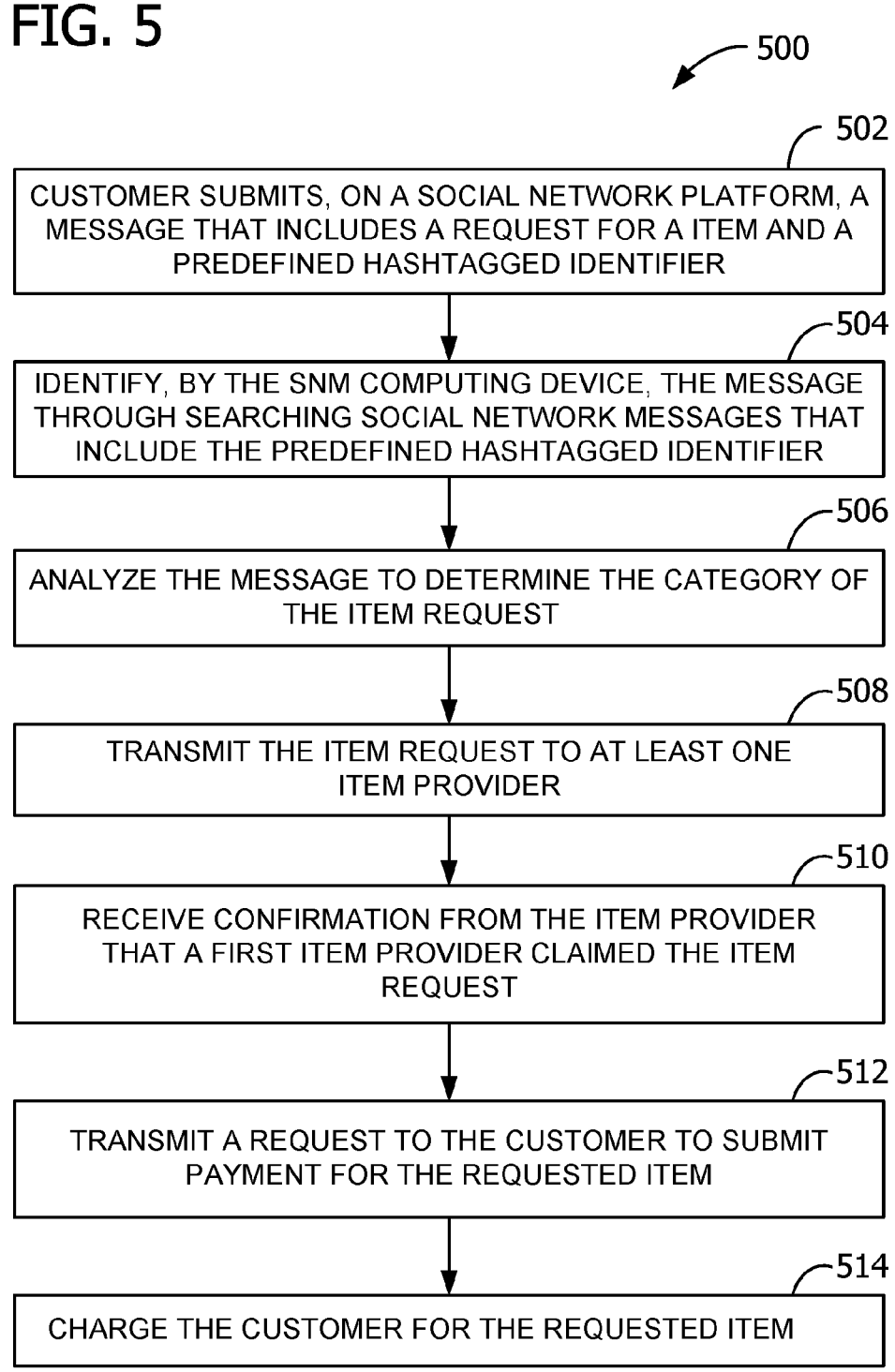

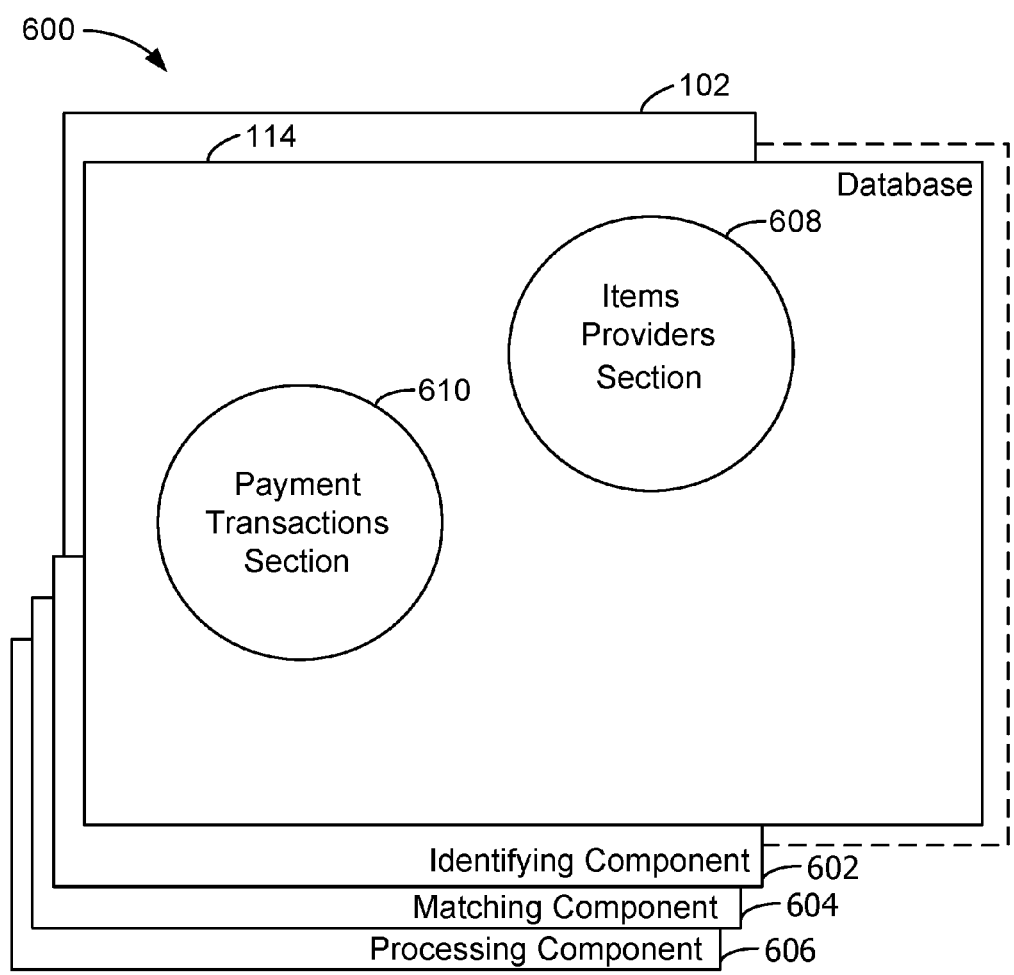

SYSTEMS AND METHODS FOR TRANSACTION MESSAGING USING SOCIAL NETWORKING PLATFORMS

BACKGROUND

The field of the invention relates generally to data analysis and matching and, more specifically, to network-based systems and methods for matching item requestors with item providers based on messages posted to a social network platform.

It is generally known to use the Internet for requesting and providing items to users. An item is defined herein as a service or a product. The interconnection of computers enabled users to quickly develop ways to conduct online commerce. As the Internet has grown and developed, a robust marketplace has appeared online where customers can find and purchase most any item that is offered by item providers.

At least some known websites (e.g., CRAIGSLIST™) enable customers to post online requests for items in the hope that item providers will respond. Likewise, these known websites enable item providers to post online offers to provide items in the hope that customers will respond. However, once a customer posts a request for an item on these known websites, the customer (i.e., item requestor) may wait for an unknown period of time for an item provider to respond and offer to provide the item. Likewise, once an item provider posts an offer to provide an item on these known websites, the item provider may wait for an unknown period of time for a customer to respond and request the item. If a response is received, the customer must communicate with the item provider regarding additional details on providing the item such as specifications, location, time availability, price-negotiation, etc. Furthermore, these known websites fail to address the risk that the item provider may not timely or properly provide the item, or the risk that the customer may not pay for the item. Accordingly, customers and item providers may find using these known websites to be a time-consuming, burdensome process that fails to address many risks.

In addition, the Internet has also grown to facilitate social networking properties. Social networking websites (e.g., TWITTER™ and FACEBOOK™) provide for the instant or nearly instantaneous connection of individuals in an online social setting. For example, TWITTER™, which has more than 500 million users, enables a user to sign in and post 140-character messages called "tweets". In many cases, tweets may be posted quickly by a user and immediately visible to others, allowing the user to instantly inform others of particular information. Moreover, the user can include hashtags, which is a type of label or metadata tag used on social network and microblogging items which makes it easier for users to find messages with a specific theme or content. Oftentimes, the user's location is included in the tweet. Hashtags are typically created by placing the hash character (or number sign) "#" in front of a word or unspaced phrase, either in the main text of a message or at the end. Searching for that hashtag will then present each message that has been tagged with it. For example, searching TWITTER™ for #soccer returns tweets from individuals around the world regarding soccer.

BRIEF DESCRIPTION OF THE DISCLOSURE

A computer-implemented method for processing transaction messages using a social network platform between a requestor and a responder is provided. The method is implemented using a social network matching (SNM) computing device including a processor and a memory. The method includes receiving, by the SNM computing device, a social network message including an item request and a predefined hashtagged identifier. The social network message was transmitted by the requestor using the social network platform. The social network message was identified based on a detection of the predefined hashtag identifier. The method further includes transmitting, by the SNM computing device, the social network message to one or more registered providers. The method also includes receiving, by the SNM computing device, a confirmation from a first registered provider of the one or more registered providers that the first registered provider will provide the requested item. The method further includes receiving, by the SNM computing device, payment information from the requestor. The method also includes transmitting, by the SNM computing device, the payment information to a payment processor, wherein the requestor is charged for the item request. The method further includes transmitting, by the SNM computing device, a notification to the first registered provider to provide the requested item.

A social network matching system for processing transaction messages using a social network platform between a requestor and a responder is provided. The system includes a processor coupled to a memory. The processor is configured to receive a social network message including an item request and a predefined hashtagged identifier. The social network message was transmitted by the requestor using the social network platform. The social network message was identified based on a detection of the predefined hashtag identifier. The processor is further configured to transmit the social network message to one or more registered providers. The processor is also configured to receive a confirmation from a first registered provider of the one or more registered providers that the first registered provider will provide the requested item. The processor is further configured to receive payment information from the requestor. The processor is also configured to transmit the payment information to a payment processor, wherein the requestor is charged for the item request. The processor is further configured to transmit a notification to the first registered provider to provide the requested item.

Computer-readable storage media for processing transaction messages using a social network platform between a requestor and a responder is provided. The computer-readable storage media has computer-executable instructions embodied hereon. When executed by at least one processor, the computer-executable instructions cause the processor to receive a social network message including an item request and a predefined hashtagged identifier. The social network message was transmitted by the requestor using the social network platform. The social network message was identified based on a detection of the predefined hashtag identifier. The computer-executable instructions also cause the processor to transmit the social network message to one or more registered providers. The computer-executable instructions further cause the processor to receive a confirmation from a first registered provider of the one or more registered providers that the first registered provider will provide the requested item. The computer-executable instructions also cause the processor to receive payment information from the requestor. The computer-executable instructions further cause the processor to transmit the payment information to a payment processor, wherein the requestor is charged for the item request. The computer-executable instructions also cause the processor to transmit a notification to the first registered provider to provide the requested item.

BRIEF DESCRIPTION OF THE DRAWINGS

FIGS. 1-6 show example embodiments of the systems and methods described herein.

FIG. 1 is a simplified block diagram of a payment processing system and a social network matching (SNM) computing device in communication with other computing devices in accordance with one example embodiment of the present disclosure.

FIG. 2 is an expanded block diagram of an example embodiment of a server architecture of the payment processing system and the SNM computing device, and a plurality of other computing devices in accordance with one example embodiment of the present disclosure.

FIG. 3 illustrates an example configuration of a client system ("client computing device") shown in FIGS. 1 and 2 in accordance with one example embodiment of the present disclosure.

FIG. 4 illustrates an example configuration of a server system shown in FIGS. 2 and 3 in accordance with one example embodiment of the present disclosure.

FIG. 5 is an flowchart of an example process for matching a customer with an item provider using an online social network, performed by the SNM computing device of FIGS. 1 and 2, in accordance with one example embodiment of the present disclosure.

FIG. 6 is a diagram of components of one or more example computing devices, for example, SNM computing device (shown in FIGS. 1 and 2), that may be used in embodiments of the described systems and methods.

DETAILED DESCRIPTION OF THE INVENTION

Figure 1:
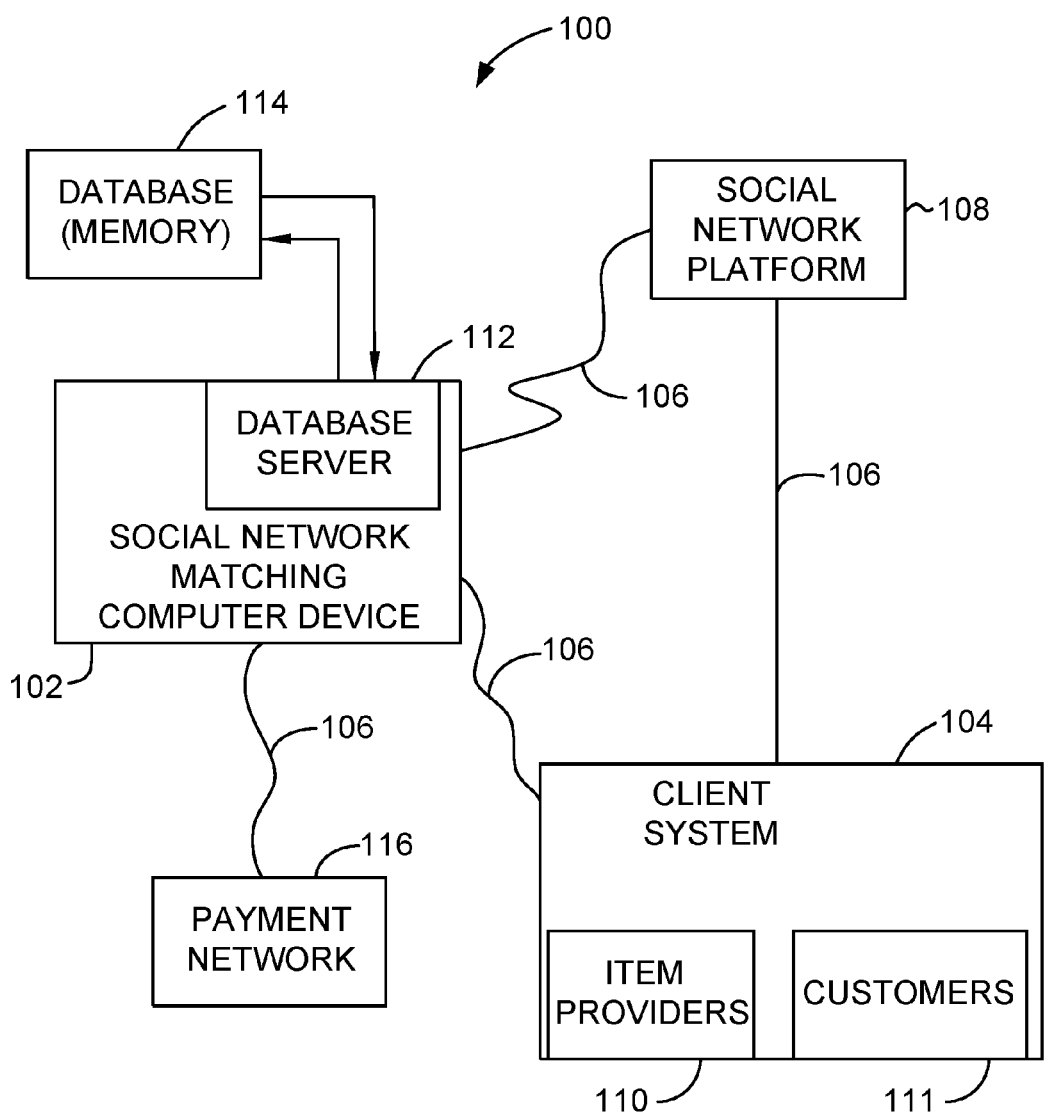

The systems and methods described herein matches customers with item providers using the popularity and open availability of social networking platforms, such as Twitter® and Facebook®. Such systems and methods are implemented using a computing device known as a social network matching (SNM) computing device. The SNM computing device includes a processor in communication with a memory. In the example embodiment, the SNM computing device is in communication with an Internet Protocol (IP) network and a payment processor. The SNM computing device is configured to: (i) search for, and/or receive a notification that, a predefined hashtagged identifier was used in a social network message, (ii) analyze the social network message with the predefined hashtagged identifier to categorize an item requested by a customer, (iii) transmit the item request, via the Internet, to local item providers that are within the category of businesses that provide the requested item, (iv) receive notification from a first item provider that the first item provider will provide the requested item to the customer, (v) prompt the customer, via the Internet, for payment for the requested item, (vi) receive payment information from the customer, which is submitted to the payment processor, wherein the customer is charged the cost for the requested item, and (vii) transmit a notification to the item provider to provide the requested item.

The customer initiates an item request via an online social network by using a web browser or an application to access a social network platform, such as Twitter® and Facebook®. The customer must have an existing account (or create a new one) for the online social networking platform. Using Twitter® as an example, after signing in, users are sent to a Twitter® webpage where they can create and submit messages (also known as "tweets" on Twitter®) that can be viewed by others on the online social network platform.

In order to request an item via a message, the customer creates a message describing the item request. The customer also includes in the message a predefined hashtagged identifier, where the identifier can be a word, a sentence, a phrase, and/or one or more letters, numbers, and/or symbols. A hashtag categorizes the message, where the hashtag symbol # is placed before the relevant identifier (no spaces) in the message. The customer then posts or tweets the message, which can be viewed by others using Twitter® or third-party applications. The message can be identified by the hashtagged identifier. The location of the customer is provided by the online social network. For example, Facebook® and Twitter® enable a user to attach location information to a post or tweet.

In the example embodiment, the SNM computing device is configured to monitor one or more online social network platforms for messages that include the predefined hashtagged identifier. In one embodiment, the SNM computing device is configured to communicate with the one or more online social network platforms and search messages for a predefined hashtagged identifier. In another embodiment, the SNM computing device can track the predefined hashtagged identifier by receiving real-time notifications from the social network platform or from a third-party application when a user posts or tweets a message that includes the predefined hashtagged identifier. In still another embodiment, the SNM computing device performs searches for the predefined hashtagged identifier directly on the social network platform.

Each item provider is stored in a database and categorized by one or more items provided and a location. For example, a business that prepares and delivers pizzas would be categorized under "pizza." Once the predefined hashtagged identifier is identified in a message, the SNM computing device identifies the customer location and analyzes the message for keywords to match the item request with appropriate item providers. For example, the SNM computing device may identify the keyword "pizza" and match the item request with item providers in the pizza category that are located within a predefined radius of the customer. In one embodiment, a business will only be shown item requests for customers located within a predefined distance from the business. This is determined based on the location of the customer, which is provided by the online social network, and the location of the item provider stored in the database. In additional embodiments, an item request will only be transmitted to item providers that are within that item category. In still further embodiments, the item requests are provided to item providers based upon additional criteria, such as ratings of the item providers.

In additional embodiments, the SNM computing device provides further analysis of the message such as natural language processing, information retrieval, knowledge representation and reasoning, and machine learning technologies, to determine the item requested.

The SNM computing device transmits the message, which includes the item request, to appropriate item providers that can provide the item, based on the item category and location of the item providers. In one embodiment, the item request is transmitted to the item providers through a website or an application. In another embodiment, the item providers receive and view the item requests through the online social network. For example, this could occur by the SNM computing device retweeting or reposting the message to item providers on the social network. In some embodiments, the SNM computing device is configured to format the message before transmitting the message to the item providers, such as including additional information, such as customer location, item request details, and/or pricing information.

A first item provider from a plurality of item providers notifies the SNM computing device that the first item provider will provide the requested item. In some embodiments, the notification from the item provider includes additional information, such as an item provider identifier and a cost to provide the requested item. In additional embodiments, item providers are notified that the item is no longer available, for example, after a first item provider claims a requested item.

Once the first item provider agrees to provide the requested item, the SNM computing device transmits a payment request to the customer. The customer is identified through a username (also known as a handle) used by the customer to post or tweet the message requesting the item. In some embodiments, the SNM computing device requests additional information from the customer, such as a first and last name, a delivery address, a telephone number, and/or clarifications on the item request. The payment transaction and/or the request for additional information can be performed by redirecting the customer to a secure webpage or by using a secure pop-up window that appears on a user interface of a computing device of the customer.

In the example embodiment, the SNM computing device handles the financial transaction between the customer and item provider by transmitting customer payment information to the payment processor, where the customer is charged for the item. In some embodiments, the SNM computing device stores in a database customer information, such as name, address, credit card information, etc., to facilitate future transactions. Once payment is successfully made by the customer, the customer is transmitted at least one or more of a name of the item provider, a location of the item provider, a telephone number of the item provider, details regarding the requested item, a price of the requested item, a confirmation that the item will be provided, or an estimated delivery time. In addition, the item provider is transmitted at least one or more of a notification to provide the item, a notification that payment has been made by the customer, a name of the customer, a telephone number of the customer, a location (i.e., address) of the customer, or details regarding the requested item (i.e., customizations). The item provider then provides the item requested by the customer.

An example implementation of the social network matching system may include a customer using an online social network platform, a payment processor, and a SNM computing device. The predefined hashtagged identifier, "#MB4T," identifies that an item has been requested. The customer posts "I want a cheese pizza #MB4T" on an online social network platform. The SNM computing device is configured to receive a plurality of social network posts from the online social network platform and search the posts for the hashtagged identifier, "#MB4T." Once the SNM computing device identifies the post "I want a cheese pizza #MB4T" based on the hashtag, the SNM computing device transmits the item request, via the Internet, to pizzerias (i.e., item providers) that can deliver the cheese pizza. Once a first pizzeria claims the request, the customer is prompted to pay for the item. The SNM computing device handles the financial transaction between the customer and item provider. Once payment is successfully made by the customer, the SNM computing device exchanges the information of the customer and the item provider. The pizzeria then prepares and delivers the cheese pizza to the customer.

The methods and systems described herein may be implemented using computer programming or engineering techniques including computer software, firmware, hardware or any combination or subset thereof, wherein the technical effect is achieved by performing at least one of: (a) receiving and reviewing social media posts for an item request with a predefined hashtag; (b) transmitting the item request to item providers; (c) receiving a notification that a first item provider will provide the requested item; and (d) performing a financial transaction between the customer and the first item provider by transmitting customer payment information to the payment processor. More specifically, a SNM computing device described herein is specially programmed with computer code to perform the above processes. The technical effects described herein apply to the technical field of matching a customer with an item provider using a social network platform. The systems and methods described herein provide the technical advantage of enabling a customer to request an item using a social network platform, and enabling an item provider to claim the requested item.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of The Open Group). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to generating a reputation score for at least one entity.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example computer system 100 used to match customers with item providers using online social networking platforms in accordance with the present disclosure. More specifically, system 100 is used for matching customers with item providers based on social network messages that include a predefined hashtagged identifier, where included with the predefined hashtagged identifier is an item requested by the customer, as described herein.

More specifically, in the example embodiment, system 100 includes a SNM (Social Network Matching) computing device 102, and a plurality of client sub-systems (only one shown in FIG. 1), also referred to as client systems 104, where SNM computing device 102 is connected to client systems 104 and social network platform 108. Client systems 104 include item provider systems 110 and customer systems 111. In one embodiment, client systems 104 are computers including a web browser, such that client systems 104 are accessible to SNM computer device 102 and social network platform 108 using the Internet. In the example embodiment, client systems 104 are operated by a plurality of customers and a plurality of item providers.

Social network platform 108 is also accessible to client systems 104 using the Internet. Client systems 104 are interconnected to the Internet through many interfaces including a network 106, such as a local area network (LAN) or a wide area network (WAN), dial-in-connections, cable modems, special high-speed Integrated Items Digital Network (ISDN) lines, and RDT networks. Client systems 104 could be any device capable of interconnecting to the Internet including a web-based phone, PDA, or other web-based connectable equipment.

SNM computing device 102 is in communication with social network platform 108 using network 106. In one embodiment, SNM computing device 102 accesses social network messages maintained on social network platform 108 and retrieves the accessed data. The data is brought back to SNM computing device 102 where the messages are searched for the predefined hashtag. This may be performed continuously or a predefined intervals (i.e., every one minute). In another embodiment, SNM computing device 102 is notified by social network platform 108 or a third-party application whenever the predefined hashtag is used in a message. In still another embodiment, the SNM computing device performs searches for the predefined hashtagged identifier directly on the social network platform.

A database server 112 is connected to database 114, which contains information on a variety of matters, as described below in greater detail. In one embodiment, centralized database 114 is stored on SNM computing device 102. In an alternative embodiment, database 114 is stored remotely from SNM (Social Network Item) computing device 102 and may be non-centralized.

Database 114 may include a single database having separated sections or partitions, or may include multiple databases, each being separate from each other. Database 114 may store data relating to social media data, item providers, customers, and/or purchases made. Database 114 may also store cardholder account data for a customer, including at least one of a cardholder name, a cardholder address, an account number, other account identifiers, and transaction information. Database 114 may also store item provider information including an item provider identifier that identifies each item provider that receives and/or accepts an item request, and instructions for settling transactions including item provider bank account information. Database 114 may also store purchase data associated with items purchased by customers from item providers. Further, database 114 may function to substantially facilitate the analysis of messages requesting items to determine the item requested and the appropriate item providers to receive the item request.

SNM computing device 112 is also in communication with payment network 116 to be used for processing transaction data.

Figure 2:
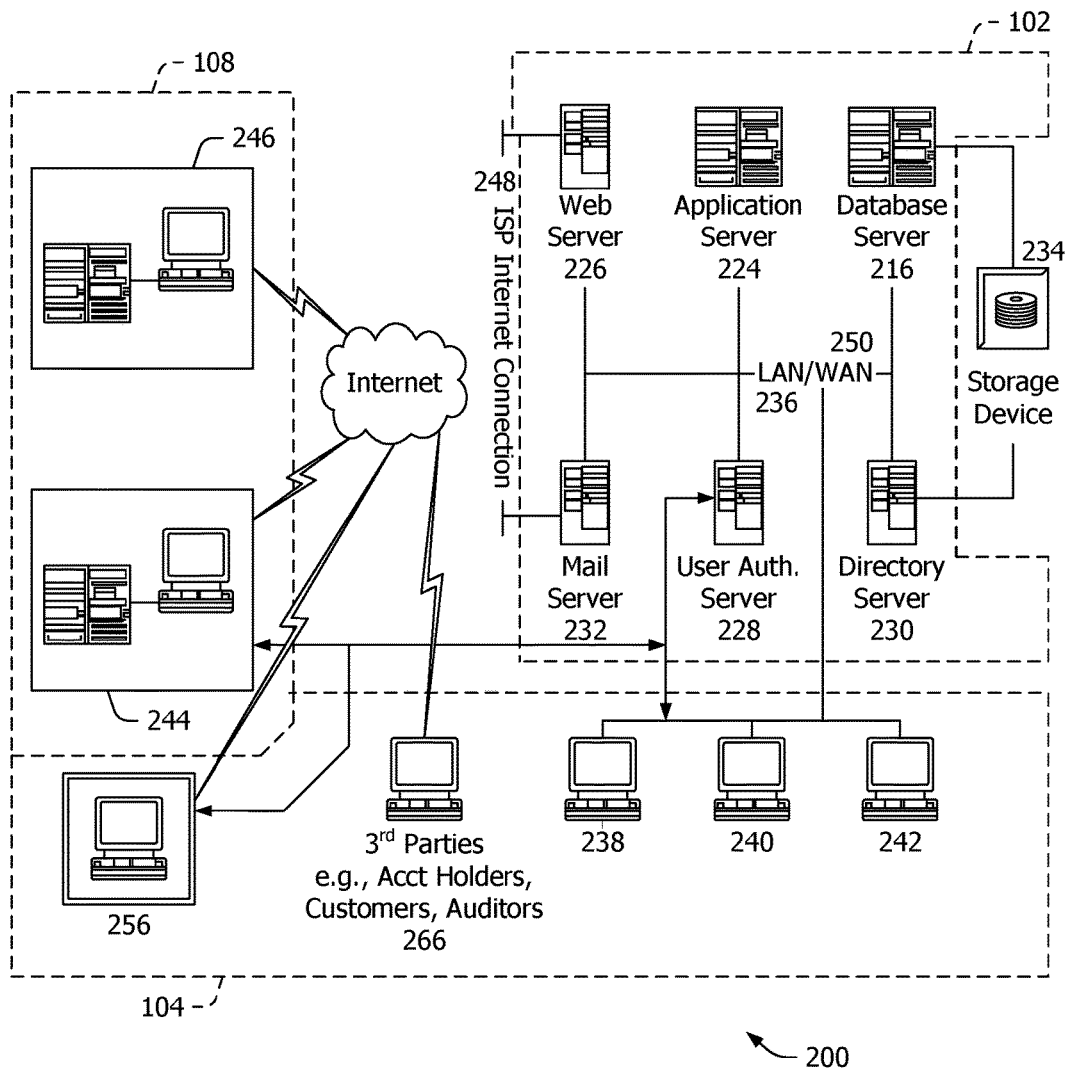

FIG. 2 is an expanded block diagram of an example embodiment of a computer server system architecture of social network matching system 200 configured to match a customer with an item provider using an online social network, in accordance with one embodiment of the present disclosure. System 200 includes SNM computing device 102, client systems 104, and social network 108. Client systems 104 include item provider systems 110 and customer systems 111. SNM computing device 102 further includes database server 216, an application server 224, a web server 226, a user authentication server 228, a directory server 230, and a mail server 232. A storage device 234 is coupled to database server 112 and directory server 230. Servers 216, 224, 226, 228, 230, and 232 are coupled in a local area network (LAN) 236. In addition, client systems 238, 240, and 242 and a third party processor workstation 242 may be coupled to LAN 236. In the example embodiment, client systems 238, 240, and 242 are coupled to LAN 236 using network connection 106. Client systems 238, 240, and 242 are coupled to LAN 236 using an Internet link or are connected through an Intranet. Client workstations 238 are further coupled to social network platform 108 using an Internet link. Each workstation 238, 240, and 242 is a personal computer having a web browser. Although the functions performed at the workstations typically are illustrated as being performed at respective workstations 238, 240, and 242, such functions can be performed at one of many personal computers coupled to LAN 136.

SNM computing device 102 is configured to be operated by various individuals including employees and to third parties, e.g., customers, item providers, developers, etc., 246 using an ISP Internet connection 248. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 250, local area network 236 could be used in place of WAN 250. SNM computing device 102 is also configured to be communicatively coupled to payment systems (not shown in FIG. 2) and online social networks 108. Payment systems include computer systems associated with merchant banks, issuer banks, and interchange network (not shown in FIG. 2). Accordingly, payment systems are configured to communicate with SNM computing device 102 to process transactions for payments provided by customers for requested items, in accordance with one or more embodiments of the present disclosure. At least one of the client systems includes a manager workstation 256 located at a remote location.

Systems 244 and 246 are online social networks 108. SNM computing device 102 is in communication with systems 244 and 246 using an ISP Internet connection 248. In one embodiment, SNM computing device 102 accesses social network messages maintained on systems 244 and 246 and retrieves the accessed data. The data is brought back to SNM computing device 102 where the messages are searched for the predefined hashtag. This may be performed continuously or at predefined intervals (i.e., every one minute). In another embodiment, SNM computing device 102 is notified by systems 244 and 246 or a third-party application whenever the predefined hashtag is used in a message.

Also, in the example embodiment, web server 226, application server 224, database server 216, and/or directory server 230 may host web applications, and may run on multiple server systems 102. The term "suite of applications," as used herein, refers generally to these various web applications running on server systems 102.

Furthermore, user authentication server 228 is configured, in the example embodiment, to provide user authentication items for the suite of applications hosted by web server 226, application server 224, database server 216, and/or directory server 230. User authentication server 228 may communicate with remotely located client systems 104, including client systems 238, 240, and 242.

Figure 3:
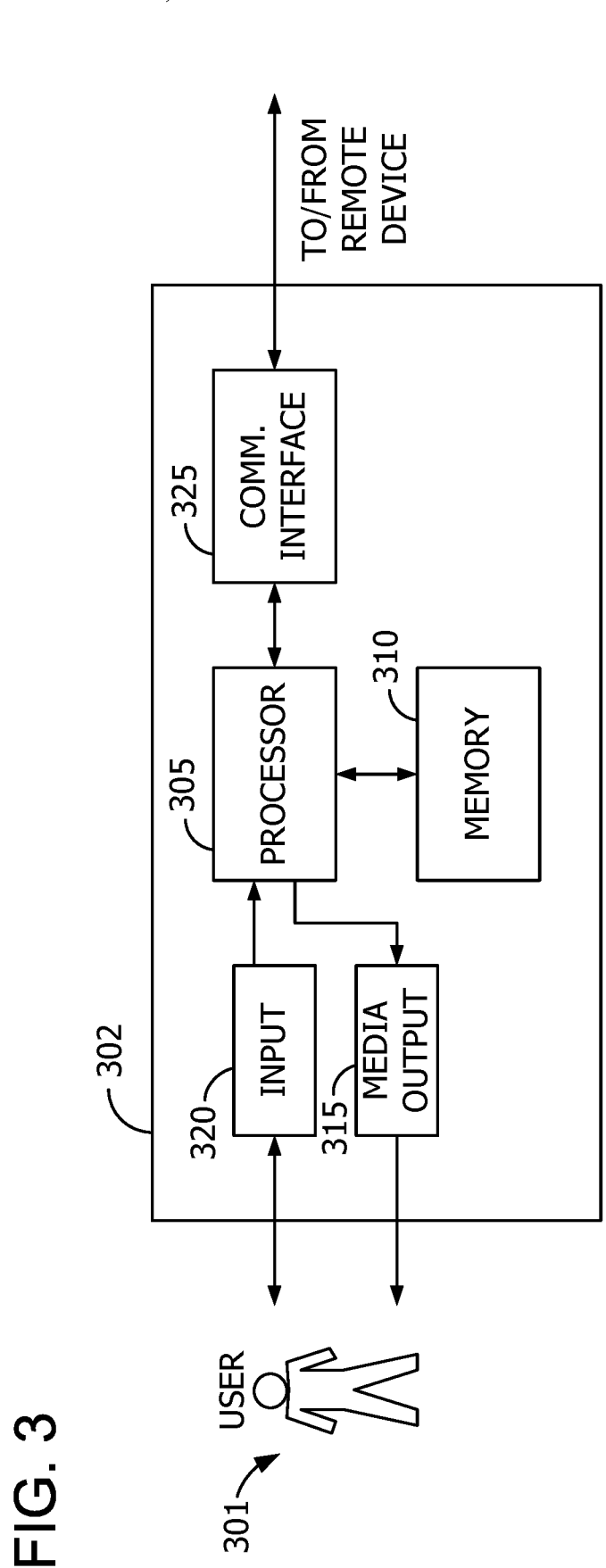

FIG. 3 illustrates an example configuration of a client system ("client computing device") shown in FIGS. 2 and 3. Client computing device 302 may include, but is not limited to, client computing devices 104, 238, 240, and 242, workstation 266, and manager workstation 256 (shown in FIG. 2).

Client computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media.

Client computing device 302 also includes at least one media output component 315 for presenting information to user 301. User 301 is a customer or an item provider. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 302 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Client computing device 302 may also include a communication interface 325, which is communicatively couplable to a remote device such as server system 108. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from social network platform 108 (i.e., an online social networking site, such as Twitter®) and/or server system 102. A client application allows user 301 to interact with a server application from server system 102.

Figure 4:
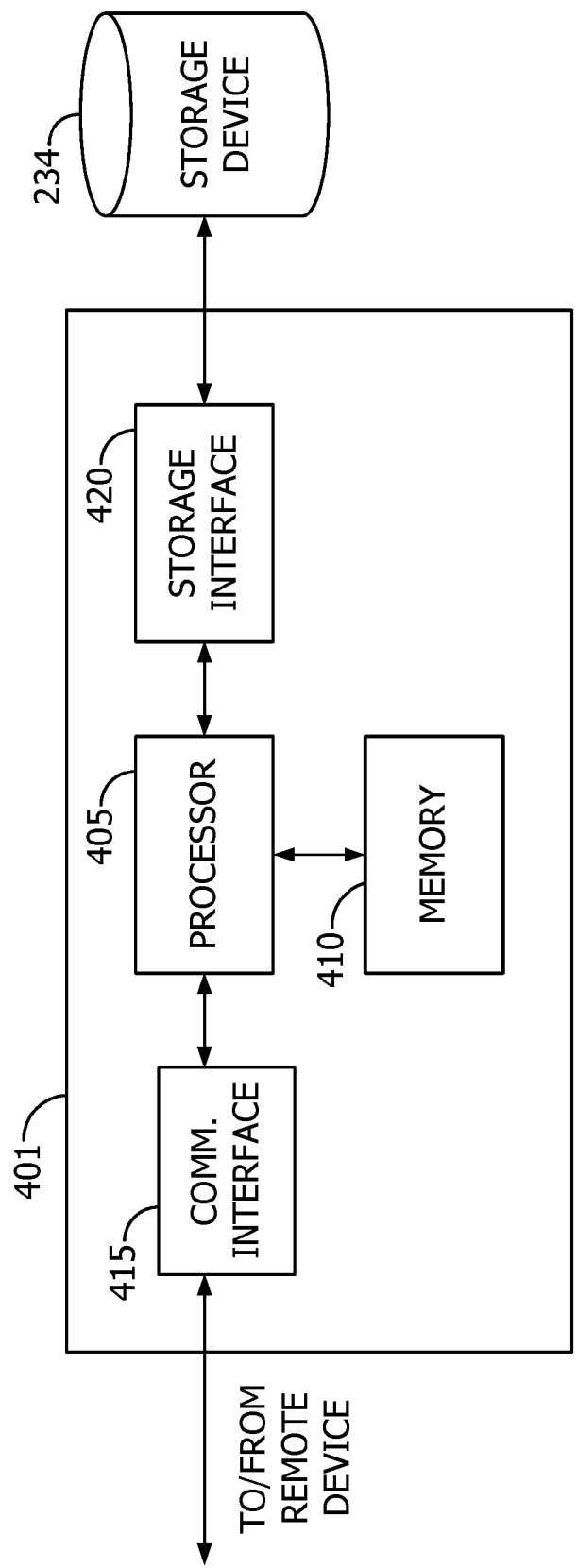

FIG. 4 illustrates an example configuration of a server computing device 401 such as server system 102 (shown in FIGS. 1 and 2). Server computing device 401 may include, but is not limited to, database server 216, application server 224, web server 226, user authentication server 228, directory server 230, and mail server 232.

Server computing device 401 includes a processor 405 for executing instructions. Instructions may be stored in a memory area 410, for example. Processor 405 may include one or more processing units (e.g., in a multi-core configuration).

Processor 405 is operatively coupled to a communication interface 415 such that server computing device 401 is capable of communicating with a remote device such as client computing device 104, social network platform 108, or another server computing device 401. For example, communication interface 415 may receive social network message (i.e., posts or tweets) transmitted from social network platform 108 via the Internet, as illustrated in FIGS. 1 and 2.

Processor 405 may also be operatively coupled to a storage device 234. Storage device 234 is any computer-operated hardware suitable for storing and/or retrieving data. In some embodiments, storage device 234 is integrated in server computing device 401. For example, server computing device 401 may include one or more hard disk drives as storage device 234. In other embodiments, storage device 234 is external to server computing device 401 and may be accessed by a plurality of server computing devices 401. For example, storage device 234 may include multiple storage units such as hard disks or solid state disks in a redundant array of inexpensive disks (RAID) configuration. Storage device 234 may include a storage area network (SAN) and/or a network attached storage (NAS) system.

In some embodiments, processor 405 is operatively coupled to storage device 234 via a storage interface 420. Storage interface 420 is any component capable of providing processor 405 with access to storage device 234. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 234.

Memory areas 410 and 234 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

FIG. 5 is a flowchart of an example process 500 that may be performed by a computing device, for example, SNM computing device 102, for matching a customer with an item provider using an online social network. A customer, using a social network platform on a user computing device, such as client system 104, posts, tweets, or otherwise submits a message 502 including a request for an item to the social network platform. The message is also accompanied by a predefined hashtagged identifier identifying that an item has been requested. In one embodiment, the SNM computing device is configured to identify 504 the message through searching social network messages for messages that include the predefined hashtagged identifier. In another embodiment, the SNM computing device receives a notification from the social network or a third-party application when the predefined hashtagged identifier is used.

Once the SNM computing device identifies the message based on the predefined hashtagged identifier, the SNM computing device is configured to analyze 506 the message to determine the category of the item request.

The SNM computing device is further configured to transmit 508 the item request via the Internet to one or more item providers within the category that can provide the item. A first item provider claims the request by transmitting 510 a notification to the SNM computing device that the first item provider will provide the requested item. Once a match occurs, the SNM computing device transmits 512 a request to the customer to submit payment for the requested item. The SNM computing device handles the financial transaction between the customer and item provider by transmitting 514 customer payment information to the payment processor, wherein the customer is charged for the item. The customer can choose to pay via a credit card, clearxchange, paypal or any other tender types. Once payment is successfully processed, the SNM computing device transmits the identities of the item provider and the customer, as well as a delivery location of the customer. The first item provider then provides the requested item for the customer.

FIG. 6 is a diagram 600 of components of one or more example computing devices, for example, SNM computing device 102 (shown in FIGS. 1 and 2), that may be used in embodiments of the described systems and methods. FIG. 6 further shows a configuration of database 114 (FIG. 2). Database 114 is in communication with several separate components within SNM computing device 102, which perform specific tasks.

SNM computing device 102 includes a hashtag identifying (HI) component 602 for identifying social network messages that includes a predefined hashtagged identifier. Additionally, SNM computing device 102 includes a matching component 604 for analyzing the social network message and sending the item request to appropriate item providers. Additionally, SNM computing device 102 includes a processing component 606 for processing a payment made by a customer for a requested item.

In an example embodiment, database 114 is divided into a plurality of sections, including but not limited to, an item providers section 608 that stores a location and one or more categories for each item provider, and a payment transactions section 610 that stores transaction history and payment information for customers. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 580, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for processing purchase transaction messages on a social network platform, the method implemented using a social network matching (SNM) computing device including a processor and a memory, said method comprising:

monitoring, by the SNM computing device, a plurality of social network messages transmitted over the social network platform;

detecting, by the SNM computing device, a predefined hashtagged identifier included within at least one of the monitored plurality of social network messages;

storing, by the SNM computing device in a database, a plurality of item providers, each of the item providers registered with the SNM computing device to provide items in at least one of a plurality of item categories;

receiving, by the SNM computing device, a subset of the social network messages posted publicly to the social network platform, wherein the subset includes the publicly posted social network messages having a predefined hashtagged identifier, and wherein each social network message of the subset includes a plain text keyword identifying a requested item for purchase by a respective requestor, the plain text keyword being separate from the predefined hashtag identifier;

parsing, by the SNM computing device, each social network message of the subset to determine a location of the requester;

determining, by the SNM computing device, one or more of the registered item providers for each social network message of the subset based on one or more of a location of the one or more registered item providers, the location of the requester, the item being requested, or items provided by the one or more registered item providers;

formatting, by the SNM computing device according to predefined formatting rules, each social network message of the subset;

transmitting, by the SNM computing device and after the formatting, each of the social network messages in the subset to the respective one or more registered item providers;

receiving, by the SNM computing device in response to transmitting each of the social network messages in the subset, a confirmation from a first registered item provider of the respective one or more registered item providers that the first registered item provider will provide the requested item to the respective requestor;

transmitting, by the SNM computing device in response to the confirmation for each of the social network messages in the subset, a payment request to the respective requestor, the payment request configured to redirect the requestor to a secure communication channel;

processing, by the SNM computing device for each of the social network messages in the subset, payment card information received from the respective requestor via the secure communication channel for the respective requested item;

transmitting, by the SNM computing device, the payment card information to a payment card processor, wherein the respective requestor is charged for the requested item; and notifying, by the SNM computing device for each of the social network messages in the subset, the first registered item provider to provide the requested item to the respective requestor.

2. The method of claim 1, wherein the SNM computing device searches the publicly posted social network messages to detect the predefined hashtagged identifier.

3. The method of claim 1, further comprising transmitting, by the SNM computing device to the first registered item provider for each social network message of the subset, information on the requested item, an address of the requestor, a phone number of the requestor, or a notification to provide the requested item.

4. The method of claim 1, further comprising transmitting, by the SNM computing device to the respective requestor for each social network message of the subset, information on the requested item, an address of the first registered item provider, a phone number of the first registered item provider, a cost of the requested item, an estimated delivery time, or a notification that the requested item will be provided.

5. A social network matching (SNM) system for processing purchase transaction messages on a social network platform, comprising:

a social network matching (SNM) computing device including a processor coupled to a memory, said processor configured to:

monitor a plurality of social network messages transmitted over the social network platform;

detect a predefined hashtagged identifier included within at least one of the monitored plurality of social network messages;

store in a database a plurality of item providers, each of the item providers registered with the SNM computing device to provide items in at least one of a plurality of item categories;

receive a subset of the social network messages posted publicly to the social network platform, wherein the subset includes the publicly posted social network messages having a predefined hashtagged identifier, and each social network message of the subset includes a plain text keyword identifying a requested item for purchase by a respective requestor, the plain text keyword being separate from the predefined hashtag identifier;

parse each social network message of the subset to determine a location of the requester;

determine one or more of the registered item providers for each social network message of the subset based on one or more of a location of the one or more registered item providers, the location of the requester, the item being requested, or items provided by the one or more registered item providers;

format, according to predefined formatting rules, each social network message of the subset;

transmit, after the formatting, each of the social network messages in the subset to the respective one or more registered item providers;

receive, in response to transmitting each of the social network messages in the subset, a confirmation from a first registered item provider of the respective one or more registered item providers that the first registered item provider will provide the requested item to the respective requestor;

transmit a payment request to the respective requestor in response to the confirmation for each of the social network messages of the subset, the payment request configured to redirect the requestor to a secure communication channel;

processing, for each of the social network messages of the subset, payment card information received from the respective requestor via the secure communication channel for the respective requested item;

transmit the payment card information to a payment card processor, wherein the respective requestor is charged for the requested item; and transmit a notification to the first registered item provider for each of the social network messages of the subset to provide the requested item to the respective requestor.

6. The SNM system in accordance with claim 5, wherein the processor is further configured to:

receive, from the social network platform, the publicly posted social network messages; and search the publicly posted social network messages for the predefined hashtagged identifier.

7. The SNM system in accordance with claim 5, wherein the processor is further configured to transmit to the first registered item provider for each social network message of the subset information on the requested item, an address of the requestor, a phone number of the requestor, or a notification to provide the requested item.

8. The SNM system in accordance with claim 5, wherein the processor is further configured to transmit to the respective requestor for each social network message of the subset information on the requested item, an address of the first registered item provider, a phone number of the first registered item provider, a cost of the requested item, an estimated delivery time, or a notification that the requested item will be provided.

9. A non-transitory computer-readable storage media for processing purchase transaction messages on a social network platform, the computer-readable storage media having computer-executable instructions embodied thereon, wherein, when executed by at least one processor on a social network matching (SNM) computing device, the computer-executable instructions cause the at least one processor to:

monitor a plurality of social network messages transmitted over the social network platform;

detect a predefined hashtagged identifier included within at least one of the monitored plurality of social network messages;

store in a database a plurality of item providers, each of the item providers registered with the SNM computing device to provide items in at least one of a plurality of item categories;

receive a subset of the social network messages posted publicly to the social network platform, wherein the subset includes the publicly posted social network messages having a predefined hashtagged identifier, and each social network message of the subset includes a plain text keyword identifying a requested item for purchase by a respective requestor, the plain text keyword being separate from the predefined hashtag identifier;

parse each social network message of the subset to determine a location of the requester;

determine one or more of the registered item providers for each social network message of the subset based on one or more of a location of the one or more registered item providers, the location of the requester, the item being requested, or items provided by the one or more registered item providers;

format, according to predefined formatting rules, each social network message of the subset;

transmit, after the formatting, each of the social network messages of the subset to the respective one or more registered item providers;

receive, in response to transmitting each of the social network messages in the subset, a confirmation from a first registered provider of the respective one or more registered item providers that the first registered item provider will provide the requested item to the respective requestor;

transmit a payment request to the respective requestor in response to the confirmation for each of the social network messages of the subset, the payment request configured to redirect the requestor to a secure communication channel;

processing, for each of the social network messages of the subset, payment card information received from the respective requestor via the secure communication channel for the respective requested item;

transmit the payment card information to a payment processor, wherein the respective requestor is charged for the requested item; and transmit a notification to the first registered item provider for each of the social network messages of the subset to provide the requested item to the respective requestor.

10. The computer-readable storage media in accordance with claim 9, wherein the computer-executable instructions cause the processor to:

receive, from the social network platform, the publicly posted social network messages; and search the publicly posted social network messages for the predefined hashtagged identifier.

11. The computer-readable storage media in accordance with claim 9, wherein the computer-executable instructions cause the processor to transmit to the first registered item provider for each social network message of the subset information on the requested item, an address of the requestor, a phone number of the requestor, or a notification to provide the requested item.

12. The computer-readable storage media in accordance with claim 9, wherein the computer-executable instructions cause the processor to transmit to the requestor for each social network message of the subset information on the requested item, including at least one of an address of the first registered item provider, a phone number of the first registered item provider, a cost of the requested item, an estimated delivery time, or a notification that the requested item will be provided.

* * * * *